United States Patent
Sanoner et al.

(10) Patent No.: US 7,977,938 B2
(45) Date of Patent: Jul. 12, 2011

(54) DEVICE AND METHOD OF DETECTING FERRITE AND NON-FERRITE OBJECTS

(75) Inventors: Hughes Sanoner, Hong Kong SAR (CN); Desmond Wai Nang Tse, Hong Kong SAR (CN); Lawrence Chi Hang Chan, Hong Kong SAR (CN)

(73) Assignee: Solar Wide Industrial Ltd., Tsuen Wan, New Territories (HK)

( * ) Notice: Subject to any disclaimer, the term of this patent is extended or adjusted under 35 U.S.C. 154(b) by 768 days.

(21) Appl. No.: 11/843,858

(22) Filed: Aug. 23, 2007

(65) Prior Publication Data
US 2008/0272761 A1 Nov. 6, 2008

Related U.S. Application Data

(60) Provisional application No. 60/915,953, filed on May 4, 2007.

(51) Int. Cl.
*G01V 3/11* (2006.01)
*G01N 27/72* (2006.01)
(52) U.S. Cl. .................... 324/233; 324/326

(58) Field of Classification Search .............. 324/66–67, 324/202, 228, 233, 326–329
See application file for complete search history.

(56) References Cited

U.S. PATENT DOCUMENTS

| | | | |
|---|---|---|---|
| 4,249,128 A | 2/1981 | Karbowski | |
| 4,507,612 A | 3/1985 | Payne | |
| 4,700,139 A | 10/1987 | Podhrasky | |
| 4,709,213 A | 11/1987 | Podhrasky | |
| 5,506,506 A | 4/1996 | Candy | |
| 5,729,143 A * | 3/1998 | Tavernetti et al. | 324/329 |
| 2008/0084212 A1 | 4/2008 | Wieland | |

FOREIGN PATENT DOCUMENTS

DE 32 28 447 A1 2/1984

\* cited by examiner

*Primary Examiner* — Bot L LeDynh
(74) *Attorney, Agent, or Firm* — Leydig, Voit & Mayer, Ltd.

(57) ABSTRACT

A metal detector for detecting the presence of a ferrite object in the proximity of inductively coupled sensor having overlapping D shaped transmitter and receiver coils. The metal detector has a phase shift circuit to phase shifting a sensor output signal by a known amount and a switch operating in synchronization with an excitation signal of the sensor for sampling the amplitude of the phase shifted output signal.

4 Claims, 2 Drawing Sheets

DEVICE AND METHOD OF DETECTING FERRITE AND NON-FERRITE OBJECTS

BACKGROUND TO THE INVENTION

1. Field of the Invention

The invention relates broadly to sensing devices for detecting ferrite and non-ferrite objects behind wall linings. Such a device is commonly called a metal and stud detector or finder. More particularly, the invention relates to a device and method for detecting ferrite and non-ferrite objects in proximity of an inductively coupled sensor.

2. Background Information

The use of inductively coupled sensors having a transmitter (or excitation) coil and a receiver coil for detecting the presence of metal objects is well known. The transmitter coil is excited with a periodically varying excitation signal which produces and alternating magnetic field. The magnetic field induces a sensor signal in the receiver coil. The presence of ferrite objects in proximity to the coils affects the inductive coupling between the coils. In particular, metal objects within the proximity cause a phase shift between the excitation signal and the induced sensor signal, which can be used to indicate the presence of the metal object. Hitherto metal detectors employing this type of sensor have suffered drawbacks including calibration stability and high processing demands on the detection circuit. To examine the amplitude and phase properties of received signals known devices typically recorded the whole waveform and then calculate changes at every point on the waveform. This creates a considerable processing overhead that requires use of a powerful and expensive DSP type processor.

In order to overcome problems with calibration stability known devices must be calibrated by a user calibration or automatic calibration function immediately prior to each use. This makes manufacture and use of the device more complicated and introduces a calibration delay at the beginning of each use of the device.

It is an objection of the present invention to provide a metal detector and a method of detecting the presence of a metal object using an inductive type sensor that overcomes or at least ameliorates some or all of the above problems.

SUMMARY OF THE INVENTION

There is disclosed herein a metal detector for detecting the presence of a ferrite object in the proximity of inductively coupled sensor having a transmitter coil and a receiver coil. The transmitter coil is excited by an excitation signal causing a sensor output signal to be induced in the receiver coil. The metal detector has a phase shift circuit for phase shifting the sensor output signal by a known amount and a switch operating in synchronisation with the excitation signal for sampling an amplitude of the phase shifted output signal. A processor is connected to an output of the sampling switch for determining the amplitude of the sampled output signal and displaying an indication of the amplitude on a display.

The metal detector also includes an electronic storage medium having stored thereon calibration information for the sensor so that the metal detector does not need to be calibrated before each use. By comparing the output signal amplitude with the calibration information the processor can determine that distance of a ferrite or non-ferrite object from the metal detector.

There is also disclosed herein a method of detecting the presence of a ferrite or non-ferrite object in the proximity of an inductively coupled sensor as used in the metal detector.

Further aspects and disclosure of the invention are provided in and will become apparent from the following description.

BRIEF DESCRIPTION OF THE DRAWING

An exemplary form of the present invention will now be described by way of example only and with reference to the accompanying drawings, in which.

DESCRIPTION OF THE EXEMPLARY FORMS OF THE PRESENT INVENTION

Figure 1:
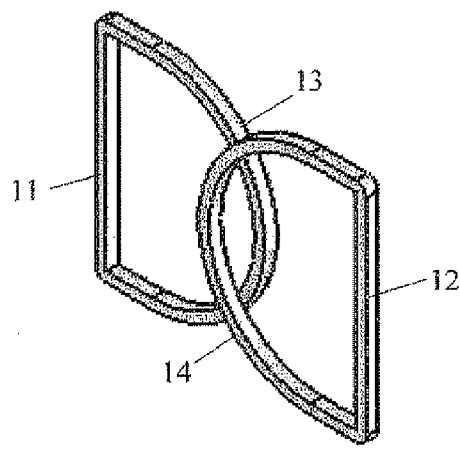
FIG. 1 illustrates an inductive type metal sensor.
Figure 2:
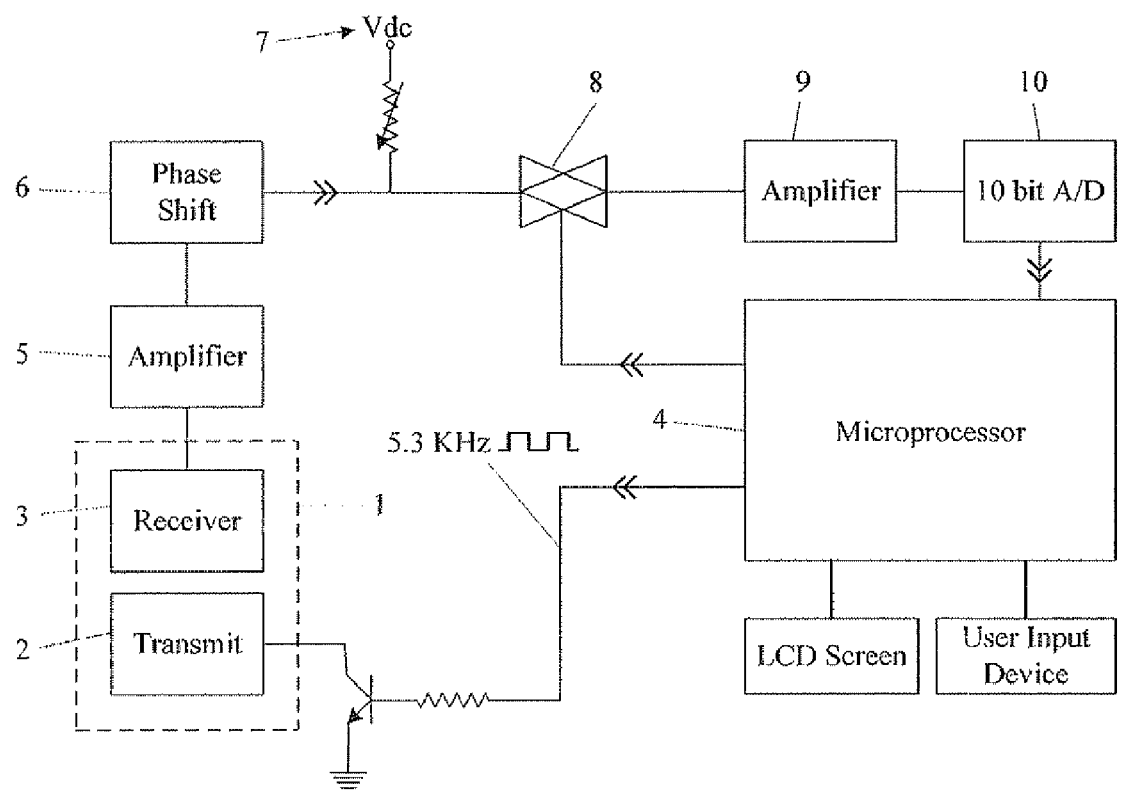
FIG. 2 illustrates a circuit diagram of a metal detector according to the invention.

Referring to the drawings, an inductively coupled sensor 1 of a metal detector has a transmitter circuit 2 and a receiver circuit 3. The transmitter circuit 2 comprises a D shaped inductor coil 11 and a capacitor in parallel having a resonant frequency of 5.3 KHz. The receiver circuit 3 comprises an identical D shaped inductor coil 12 and a capacitor in parallel. The receiver circuit 11 and transmitter circuit 12 are located with overlapping curved portions 13, 14 and are inductively coupled. When the transmitter coil 11 is excited with a periodically varying (i.e. alternating) excitation signal an alternating magnetic field is set up that induces a resultant periodically varying signal in the receiver coil 13. The presence of a non-ferrite object within the magnetic field of the transmitter coil 11 will cause an increase in the amplitude of the resultant periodically varying signal generated in the receiver coil 13. The amount of increase is related to the distance between the transmitter 111 and receiver 13 coils and the non-ferrite object. The presence of a ferrite object within the magnetic field of the transmitter coil 11 will cause a change in the phase (i.e. a phase shift) of the resultant periodically varying signal generated in the receiver coil 13. The amount of phase shift is related to the distance between the transmitter and receiver coils and the ferrite object.

A microprocessor 4 generates a 5.3 KHz square wave excitation signal for the transmitter circuit 2, which in turn generates a 5.3 KHz alternating magnetic field. A 5.3 KHz sine wave signal is induced in the receiver coil 13 by the alternating magnetic field. This sine wave signal from the receiver circuit 3 is amplified by a pre-amp circuit 5 connected to an output terminal of receiver circuit 3. The pre-amp 5 is a typical non-inverting amplifier. The amplified sine wave signal is then manipulated and analysed by a series of following circuits to determine whether there is a ferrite, or non-ferrite object in the vicinity of the transmitter and receiver coils.

Figure 3:
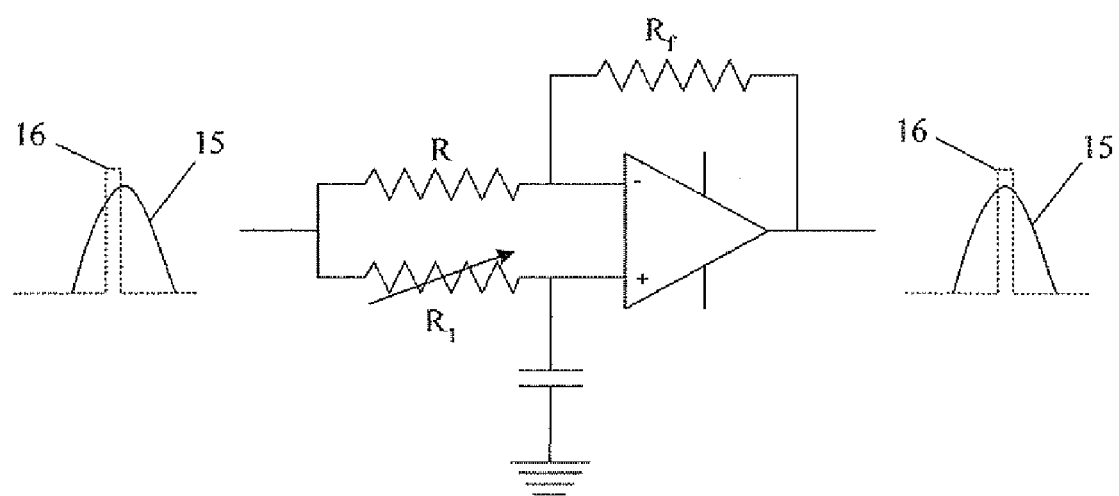
FIG. 3 illustrates a phase shift circuit of the invention.

In practice there will always be a constant phase shift between the generated excitation signal and the sensor signal induced in the receiver coil even in the absence of ferrite or non-ferrite objects in proximity of the sensor. This phase shift results from the physical and electrical characteristics of the sensor and coils and imperfect coupling of the coils. As discussed later, the sensor output signal is sampled in synchronisation with the excitation signal. In order to eliminate the effect of the inherent phase shift, so that any phase shift can be attributed to the presence of a ferrite object, a phase shift circuit 6 is provided to move the sensor output sine wave to a specific reference phase, effectively eliminating the effect of the inherent phase shift in later sampling. In the preferred embodiment the phase shift circuit 6 shifts the phase of the output sine wave 15 so that its peak amplitude is in a sampling window 16 of a set of sampling switches 8 when no external ferrite or non-ferrite objects are in proximity of the sensor. The sampling switches are driven in synchronisation with the excitation signal at 5.3 KHz. A preferred embodiment of the phase shift circuit is shown in FIG. 3. The op-amp circuit is an all-pass filter that alters the phase of the sine wave 15 without affecting its amplitude. In the circuit phase shift varies with frequency. The sine wave 15 has a constant frequency of 5.3 KHz and so the phase shift is constant. The amount of phase shift can also be varied by changing variable resistor R1. The value of R1 is determined during manufacture to eliminate the effect of the inherent phase between the sensor coils 11 and 13 due to electrical characteristics of the sensor and coils and imperfect coupling.

The output of the switches 8 is a regulated DC output voltage. Thereinafter, if a non-ferrite object comes into proximity of the sensor the amplitude of the receiver coil signal increases and the regulated DC voltage output of the switches likewise increases. If a ferrite object comes into proximity of the sensor the phase of the receiver coil signal changes moving the peak amplitude out of the sampling window of the switches 8 and the regulated DC voltage output of the switches therefore decreases. This arrangement allows amplitude to indicate the presence of both ferrite and non-ferrite objects in proximity of the sensor and so a conventional 8-bit microprocessor can be used in the metal detector rather that a more expensive DSP chip that was hitherto needed to detect phase shift caused by ferrite objects.

A DC bias (offset) voltage 7 is applied on the output of the phase shift circuit 6 in order to keep its peak output voltage above a minimum value, for example 0.5 volts. There is no need to calibrate for a null signal because the aim of the DC bias voltage is to compensate the circuit for inductor coil and capacitor tolerances of the transmitter and receiver circuits.

A power amp 9 is used to amplify the output DC voltage of the switches 8 to achieve a higher resolution of data analysis. The amplified DC voltage is sampled by a 10 bit A/D converter 10 that is coupled to the microprocessor 4 for comparison of the DC level with reference data and determination of the presence and distance of an object in the proximity of the sensor.

The relative position of the transmitter and receiver coils is fixed and known and so the distance of any object from the sensor can be determined from the amount of change in amplitude of the regulated DC output voltage of the switches 8. The metal detector is calibrated at the factory to determine the change in amplitude of the regulated DC output voltage of the switches 8 when ferrite and non-ferrite objects are brought into proximity of the sensor. The calibration information is stored in an EEPROM (Electrically Erasable Programmable Read-Only Memory) for lookup by the microprocessor. The metal detector does not need to be calibrated before each use and no user or automatic calibration functions are provided in the metal detector. Simply by comparing the regulated DC output voltage of the switches 8 with the calibration information is stored in the EEPROM the processor can provide an information to the user on the type of any object being detected, i.e. ferrite or non-ferrite, and its distance from the sensor. By displaying distance information on the output display the user can locate the object behind a wall lining and determine its depth within the wall/behind the wall lining. As the metal detector is moved over a wall surface in a single direction the displayed distance of an object from the detector will reduce to the sensor until the detector passes over the object after which the displayed distance will begin to increase. At the closest distance the object is directly under the sensor and the displayed distance if the objects depth.

Other advantages of the metal detector are that it prevents drilling onto a metal object if a traditional calibration and calibrate cycle is done on top of any metal object. It can also minimize inaccuracy of depth indication if calibrated near a ferrite or non-ferrite metal.

It should be appreciated that modifications and/or alterations obvious to those skilled in the art are not considered as beyond the scope of the present invention.

What is claimed is:

1. A metal detector for detecting a ferrite or non-ferrite object, the metal detector comprising:
   an inductively coupled sensor having a transmitter coil and a receiver coil, the detector detecting a phase difference or an amplitude difference between signals in the transmitter and receiver coils in detecting the ferrite or non-ferrite object proximate the sensor;
   an electronic storage medium having stored therein calibration information for the sensor such that the metal detector does not need to be calibrated before each use;
   a display for indicating distance of the ferrite or non-ferrite object from the metal detector;
   a sampling circuit for converting phase difference between the signals in the transmitter and receiver coils into a change in a signal amplitude; and
   a processor coupled to the sampling circuit, the electronic storage medium, and the display, and programmed to compare the signal amplitude with the calibration information and to output on the display the distance of the ferrite or non-ferrite object from the metal detector.

2. The metal detector of claim 1 wherein the sampling circuit comprises a phase shift circuit for phase shifting a sensor output signal by a fixed amount and a switch operating in synchronisation with an excitation signal of the sensor for sampling amplitude of the output signal.

3. A method of detecting a ferrite or non-ferrite object proximate an inductively coupled sensor having a transmitter coil and a receiver coil, the method comprising:
   detecting a phase difference or an amplitude difference between signals in the transmitter and receiver coils;
   providing an electronic storage medium having stored therein calibration information for the sensor such that the metal detector does not need to be calibrated before each use;
   converting the phase difference between signals in the transmitter and receiver coils into a change in a signal amplitude;
   comparing the signal amplitude with the calibration information; and
   outputting, on a display, distance of the ferrite or non-ferrite object from the metal detector.

4. The method of claim 3 wherein converting the phase difference between signals in the transmitter and receiver coils into a change in a signal amplitude comprises manipulating a sensor signal so that the sensor signal has a known phase reference, and measuring amplitude of the sensor signal that has been manipulated at a known point in a cycle of the sensor signal.

* * * * *